Jan. 6, 1942.  R. E. BOOTH ET AL  2,269,176
COATED REFRACTORY MELTING POT
Filed June 26, 1940
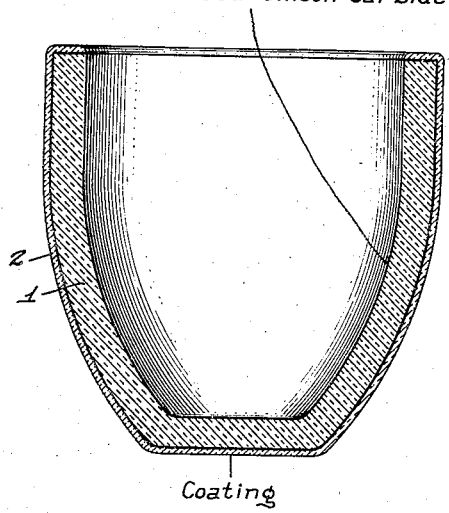
Inventors:
Ralph E. Booth,
Joseph Scorzoni,
by Harry E. Dunham
Their Attorney.

Patented Jan. 6, 1942

2,269,176

UNITED STATES PATENT OFFICE 2,269,176

COATED REFRACTORY MELTING POT

Ralph E. Booth and Joseph Scorzoni, Lynn, Mass., assignors to General Electric Company, a corporation of New York Application June 26, 1940, Serial No. 342,594

1 Claim. (Cl. 263—48)

The present invention relates to refractory coatings for non-metallic melting pots or receptacles adapted to contain molten metals such as molten aluminum. It is concerned particularly with carbon bonded silicon carbide crucibles provided with such coatings.

Non-metallic or refractory crucibles or pots, such as carbon-bonded silicon carbide crucibles, have to a large extent replaced metal pots as containers for molten aluminum and the like. Although silicon carbide crucibles exhibit certain advantages over metallic pots in not contaminating the molten metals with metallic impurities and in exhibiting a useful life several times that of many of the metal pots, the life of these refractory crucibles however is considerably shortened by heating in an oxidizing flame or in the presence of an oxidizing atmosphere.

It is an object of this invention to provide a non-metallic melting pot or crucible of increased useful life irrespective of the atmosphere surrounding the crucible during use.

Another object of this invention is to provide a carbon bonded silicon carbide crucible with a protective coating, which coating is integrally bonded to said crucible and effectively prevents oxidation of the crucible.

In accordance with this invention the above objects are attained by coating the surface of the refractory crucible with a refractory material comprising a fused mixture of flint and an inorganic binder. This coating is applied to the outside surface of these non-metallic receptacles thereby preventing the oxygen in the air from coming in contact with the carbon or graphite bonding material and causing heat erosion of the crucible due to oxidation thereof.

Non-metallic crucibles of the silicon carbide type have been provided with certain linings such as fused alumina, fused magnesia, carbon or the like. These linings, however, have been applied primarily to the inner surface of crucibles intended for use in melting low carbon steels having a strong affinity for carbon and in no way have affected the useful life of the crucible in so far as oxidation of the outer surfaces thereof is concerned. The coating materials of this invention are intended primarily for application to those portions of the crucible surface coming in contact with the surrounding atmosphere during the heating thereof and the accompanying drawing containing suitable legends shows, in cross-section, a carbon-bonded silicon carbide crucible 1 having the desired surface area covered with our coating materials 2.

In carrying the invention into effect, the non-metallic crucible, such as a carbon bonded silicon carbide crucible, is provided with a sintered or fused refractory coat prepared as follows:

A glass or enamel is first made, for example, by fusing the following ingredients at 900° C.:

| | Pounds |
|---|---|
| Flint | 97 |
| Borax | 123 |
| Soda ash | 18 |
| Feldspar | 86 |
| Cryolite | 40 |
| Fluorspar | 27 |
| Sodium nitrate | 12 |
| Zinc oxide | 21 |
| Boric acid | 13 |

After cooling, this fused material is crushed and the crushed material used in the preparation of refractory coating composition containing, for example, the following ingredients:

| | Pounds |
|---|---|
| Flint | 43.30 |
| Glass (from above formula) | 32.10 |
| Tin oxide | 2.24 |
| Ball clay | 10.60 |
| Magnesium carbonate | .08 |
| Borax | 5.40 |
| Soda ash | 6.30 |
| Water | 40.00 |

The solid ingredients are mixed, ground or milled together and formed into a paste or wash with the water. This paste is applied to the surface of the crucible by any of the usual methods such as dipping, brushing, spraying or the like. The coated crucible preferably is air dried at room temperature for sufficient time to remove substantially all of the water originally present in the paste before firing. For most purposes, a period of about 24 hours is ample. This time can be materially shortened if temperatures above room temperature are used for drying purposes. In most instances three hours at a temperature of 160° C. is sufficient.

When dry, the crucibles are fired at an elevated temperature sufficient to obtain a satisfactory bonding of the vitreous coating to the crucible surface. This fusing or sintering temperature will vary depending upon the type of crucible and the condition desired in the final coating. Preferably the firing temperatures range between 700° C. and 1050° C. and these temperatures are maintained for a period of time sufficient to obtain the desired bond. A substantial sintering or complete fusion of the protective coating material is preferred. After firing, the crucible is ready for use as a melting pot for aluminum, aluminum alloys, and the like, and can be heated to whatever temperatures are ordinarily employed for such purposes. Additional layers of protective coating material may be applied to the crucible and bonded thereto in the above described manner.

The glass and some of the remaining ingredients of the above described composition other than the water apparently serve as an inorganic binder for the flint in the sintered or fused coatings although some or all of the flint may also enter into the fusion product particularly when the coating is heated to the higher temperatures mentioned above. Hence in describing the coating either as a fused or sintered mixture of flint and an inorganic binder, it is intended to refer to the bonded mixtures such as described above in which the flint may or may not be present as such in the final sintered or fused product.

In certain instances it may be desirable to subject the coated crucible to a second firing at a slightly higher temperature than the first to obtain a more completely fused or glassy coating.

Preferably the protective coating material of this invention is used on silicon carbide crucibles that have been previously provided with a fused boric acid film or coating.

The flint is an essential ingredient of the refractory coating and the content thereof should not vary more than 20 per cent from that given in the formula. Thus from 40 to 60 parts by weight of flint may be used in combination with the specified amounts of the remaining ingredients or their equivalents.

As previously stated, the fused or sintered coating materially increases the life of silicon carbide crucibles apparently by effectively preventing heat erosion or oxidation of the bonded silicon carbide. Whereas uncoated crucibles have exhibited a maximum useful life of about four weeks, the application of the refractory coating has been found to increase the useful life of these crucibles to at least fourteen weeks.

For example, when samples of the coated and uncoated silicon carbide crucibles were subjected to an air stream at 1050° C. for 200 hours, the coated specimens showed no substantial oxidation or deterioration while the uncoated specimens became badly oxidized and eroded. Further, the coated surfaces of crucibles loaded with aluminum and held at 800° C. for 325 hours were not visibly oxidized or heat-eroded at the end of this period.

Although the useful life of such crucibles has been markedly increased, sometimes as much as eight times, by the presence of the protective coating, the cost of coating the crucibles is only a small fraction of the original price of the uncoated crucible.

What we claim as new and desire to secure by Letters Patent of the United States is:

A container suitable for use with molten aluminum and the like comprising a carbon-bonded silicon carbide receptacle having a vitreous coating on the outside surfaces which are in contact with the surrounding atmosphere during the heating thereof, said coating being capable of effectively protecting the receptacle from oxidation thereof and consisting of from 40 to 60 parts by weight of flint and about 57 parts by weight of a fused inorganic binder comprising a fused mixture of an inorganic enamel, ball clay, borax, soda ash, and tin oxide.

RALPH E. BOOTH.
JOSEPH SCORZONI.